April 25, 1933.  A. J. WEATHERHEAD, JR  1,905,664
METHOD OF PRODUCING A CONTROLLING DEVICE
Filed Feb. 6, 1929  2 Sheets-Sheet 2
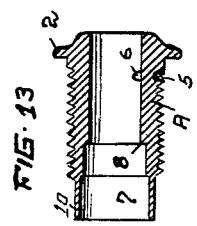
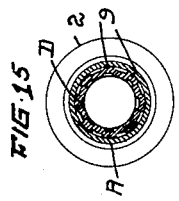
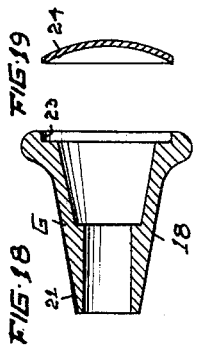
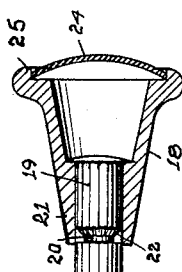
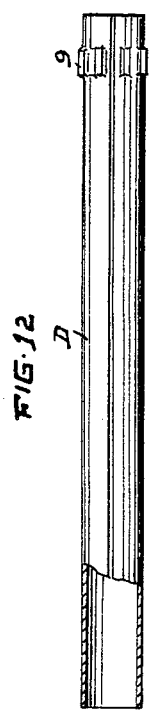
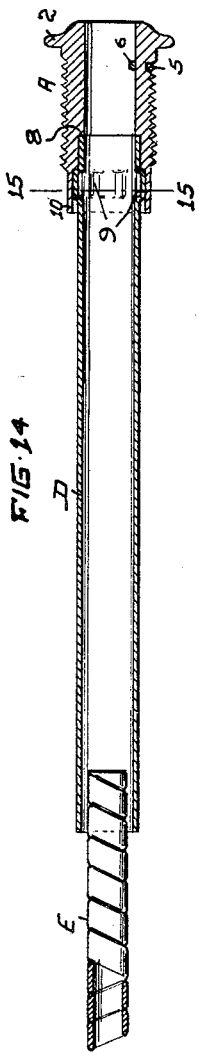
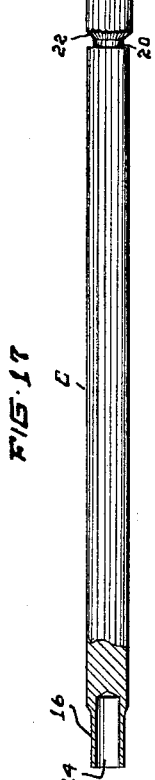
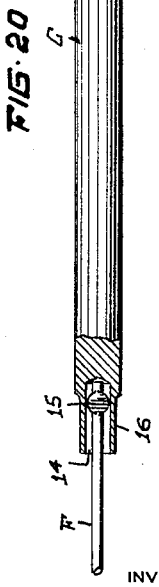
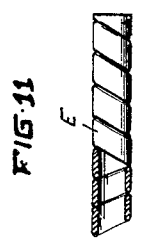
INVENTOR
A.J. WEATHERHEAD JR
BY Fisher, Moser & Moore
ATTORNEYS Patented Apr. 25, 1933

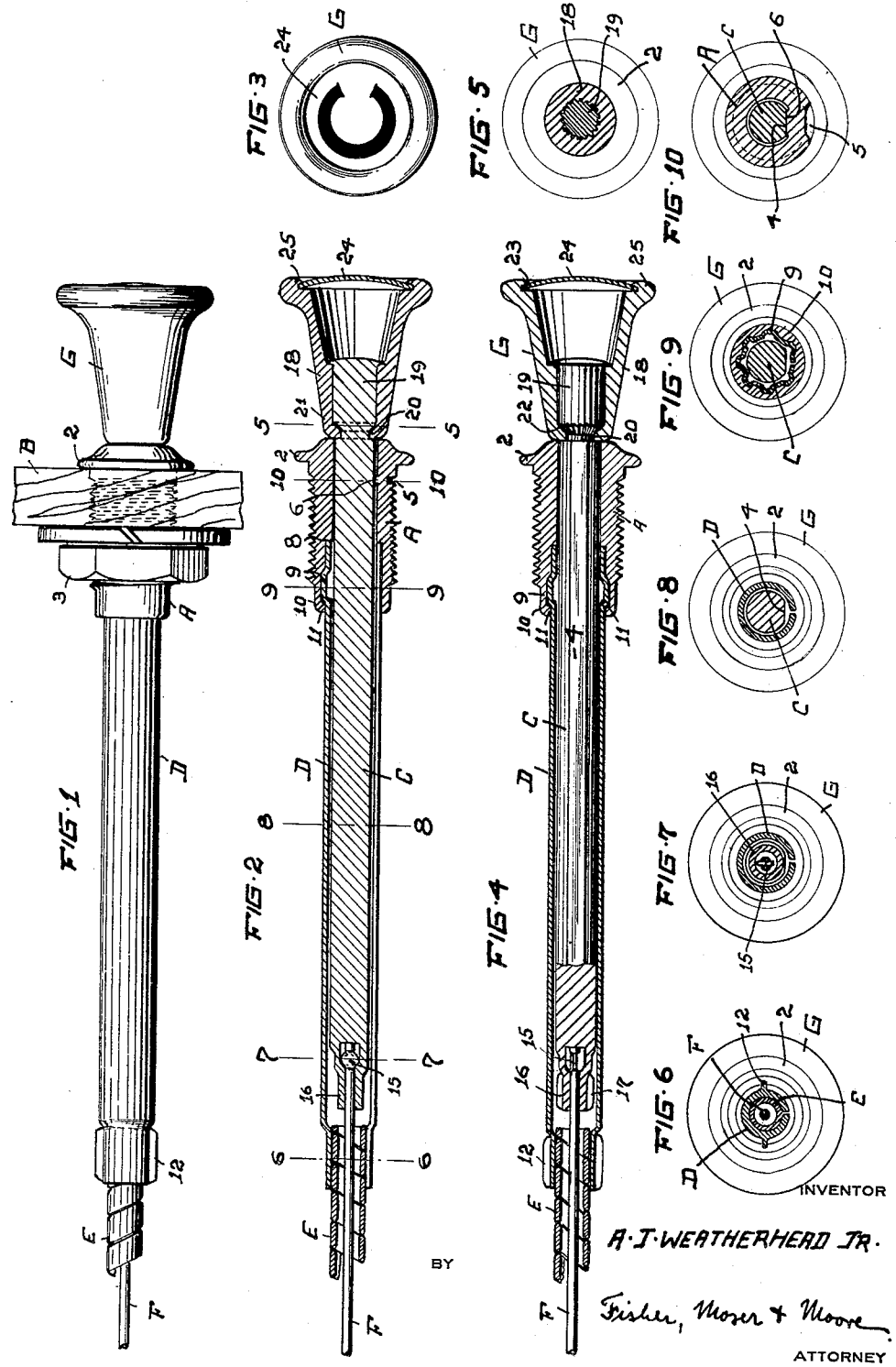

1,905,664

UNITED STATES PATENT OFFICE

ALBERT J. WEATHERHEAD, JR., OF CLEVELAND, OHIO

METHOD OF PRODUCING A CONTROLLING DEVICE

Application filed February 6, 1929. Serial No. 337,759.

My invention relates to a method of producing a controlling device, and more particularly to a method of producing a manually-operable controlling device wherein a wire is associated with a flexible conduit to operate any apparatus or appliance located remotely from a predetermined station or the main place of attachment of the device. For example, the present device may be mounted upon the instrument board or dash of a motor driven vehicle and used to control a carburetor choke valve, engine throttle, heater damper, or any other apparatus carried on the vehicle. In general my purpose is to provide a method for controlling a durable controlling device of simple and novel construction which may be produced in a facile way at a low cost.

In the accompanying drawings, Fig. 1 is a top view or elevation, larger than actual size, of my improved controlling device, and Fig. 2 a sectional view longitudinally of the same assembly of parts. Fig. 3 is an end view of the controlling knob or handle. Fig. 4 is a sectional view longitudinally through the device in a plane at right angles to the view shown in Fig. 2. Fig. 5 is a cross-section on line 5—5 of Fig. 2, showing the serrated union or joint between the knob and stem. Fig. 6 is a cross sectional view on line 6—6 of Fig. 2, showing the spirally wound conduit clamped within its supporting tube. Fig. 7 is a cross section on line 7—7 of Fig. 2, showing the flattened portion of the wire within its socket in the operating stem. Fig. 8 is a cross section on line 8—8 of Fig. 2, showing the split tube and the flattened stem therein. Fig. 9 is a cross section on line 9—9 of Fig. 2 showing the interlocking union between the tube and its supporting thimble or bushing. Fig. 10 is a cross section on line 10—10 of Fig. 2, showing the indented portion in the bushing which coacts with the flattened side of the stem to prevent rotation of the stem. Fig. 11 is a side elevation and sectional view of a portion of a flattened spring wire conduit, Fig. 12 a side elevation and sectional view of the split tube, and Fig. 13 a sectional view of the thimble or bushing as these parts appear before they are assembled. Fig. 14 is a sectional view of the conduit, split tube, and the bushing sleeved together, but not fastened together. Fig. 15 is a cross sectional view of the bushing and tube on line 15—15 of Fig. 14. Fig. 16 is a side view of the spring wire, Fig. 17 a side elevation and sectional view of the operating rod or stem, Fig. 18 is a sectional view of the hollow knob, or handle, and Fig. 19 a sectional view of the index plate, as these parts appear before they are assembled. Fig. 20 is a side elevation and sectional view of the wire and stem, and the knob and index plate assembled, but not permanently united together.

The device consists of a screw-threaded thimble, sleeve, or bushing A of cylindrical form having a flanged head 2 to permit it to be clamped upon an instrument board or other supporting plate or member B by a nut 3 or other locking means. The main part of bushing A is formed with a round central bore of approximately the same diameter as a round solid rod or stem C which is flattened at one side 4. This stem is free to slide within the bushing which is indented at 5 near its flanged head to provide a transverse rib 6 internally to engage the flat side 4 of the stem, thereby preventing the stem from turning within the bushing. This stem extends through the bushing into a split tube D which is clamped rigidly at one end within a reduced end of the bushing. To permit a rigid interlocking connection to be made the bushing is formed with a stepped counterbore 7, see Fig. 13, forming in effect inner and outer stepped recesses in the wall of the aforesaid bore. The inner and smaller portion of this counterbore is of approximately the same diameter as tube D, to permit the tube to be inserted therein until engaged with the annular shoulder 8 at the inner end of the counterbore. A series of ribs, teeth, or corrugations 9 are stamped outwardly in the wall of the tube back from the end thereof where they may be confined within the outer and larger portion of the counterbore opposite the reduced end or smooth extension 10 of bushing A. The wall of the bushing at this point is relatively thin and may be readily contracted, especially at the outer end of extension 10 where projected into overhanging relation with the teeth or corrugations 9. Thus, tube D may be firmly united to the bushing by contracting the wall 10 and flanging the overlapping end 11 inwardly until the metal is crowded into the interspaces and against the sharp corners of the teeth or corrugations 9, thereby locking the tube securely against longitudinal movement and also rotative movement. Preferably, the teeth or corrugations 9 are formed first in a flat sheet of metal which is then rolled into a tubular form of uniform diameter throughout its length except where ribbed or corrugated. When the tube D is affixed to bushing A it serves as a rigid extension thereof, and a further extension is provided by a metal conduit E formed of flattened spring wire coiled spirally to a uniform diameter less than the internal diameter of the tube D to permit one end of the conduit to be inserted into one end of the tube and to be tightly clamped therein by contracting the tube. A punch press and a mandrel may be used in this operation, and the diameter of the tube reduced in substantial degree by developing fins or ribs 12 in the sides of the tube as delineated in Fig. 6. Bushing A and conduit E are thereby firmly united to opposite ends of the tube D with a minimum amount of labor and at a low cost, and to further reduce the cost the conduit is made of a strip of flat spring material having greater width than thickness, for example, a round spring wire which has been flattened to a greater width than its original diameter. A coiled conduit made of flattened wire or equivalent stock saves material and speeds up forming operations, as a lesser number of coils to the inch are produced in coiling operations compared with the use of round wire of the same diameter which has not been flattened.

The device includes a flexible operating member F which extends through conduit E to the apparatus or appliance to be operated, and this flexible member is preferably a steel wire secured to operating stem C in the following manner. Thus, in producing stem C, one end thereof is turned or reduced in diameter and drilled or bored to a predetermined depth to provide a round opening or socket 14 axially in the stem. In severing wire F into given lengths a portion thereof is stamped flat and distended to provide a round flat enlargement or extremity 15. This enlarged end of the wire is then inserted into the socket and the reduced tubular end 16 of stem C is crimped or contracted for a portion of its length adjacent enlargement 15, thereby uniting the wire to stem C, either tightly without permitting it to turn in the socket, or loosely to permit a swiveled connection to be obtained. Upsetting dies are used in this proceeding, and fins or ribs 17 are developed at opposite sides of the reduced end 16 of stem C. However, these fins do not project laterally beyond the original diameter of the main body of stem C, owing to the preliminary step of reducing the diameter of the stem at its end where provided with bore or socket 14. Accordingly, the fins or projections 17 on the stem offer no obstruction to the introduction of the wire and stem into the open end of bushing A when the parts are assembled.

A knob or handle G having a tapered shank or body 18 is fastened to the outer end 19 of stem C, which end is formed with an annular groove 20 to permit the end edge 21 of the shank of the knob to be flanged or turned inwardly therein. This operation is facilitated by making the knob hollow and having its outer end open to expose the end of the stem so that it may be engaged by a suitable tool or upset by a die. One side wall of groove 20 or a corner edge thereof is also serrated to permit the parts to be interlocked more effectively. Hollow knob G is also formed with a shallow recess 23 at its outer end to receive an index disk or plate 24 as shown in Figs. 18 and 19. The disk may be of concavo-convex formation to permit it to be expanded and locked in place by the application of pressure, or the corner border edge 25 of recess 23 may be peened over the border edge of the disk. In using a hollow knob a considerable saving in material is effected and the costs reduced thereby, and the steps to affix the hollow knob to the stem are simplified and yield a considerable saving in cost. Moreover, the union between the knob and stem is rigid and strong and capable of withstanding all the torsional, pulling and pushing strains to which a device of this kind is subjected.

What I claim is:

1. A method of producing a controlling device as described, including the steps of forming a tube close to its end with outwardly extending narrow and relatively short corrugations arranged parallel to the axis of said tube, in forming a bushing having approximately the same inner diameter as said tube with a stepped counter-bore, in inserting the corrugated end of said tube into said bushing until engaged with the shoulder at the inner end of said counter-bore, and in contracting the end of the counter-bored portion of said bushing to interlock with said corrugated end, and to embed said corrugations within the wall of said bushing.

2. A method of producing a controlling device as described in claim 1, including the step of indenting a portion of said bushing on a straight line inwardly to a lesser diameter than the internal diameter of the tube.

In testimony whereof I affix my signature.

ALBERT J. WEATHERHEAD, Jr.